United States Patent
Fujii (10) Patent No.: US 10,952,071 B2
(45) Date of Patent: Mar. 16, 2021

(54) COMMUNICATION APPARATUS, METHOD OF CONTROLLING THE COMMUNICATION APPARATUS, AND PROGRAM

(71) Applicant: CANON KABUSHIKI KAISHA, Tokyo (JP)

(72) Inventor: Kenichi Fujii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 439 days.

(21) Appl. No.: 15/548,726

(22) PCT Filed: Jan. 15, 2016

(86) PCT No.: PCT/JP2016/000204
§ 371 (c)(1),
(2) Date: Aug. 3, 2017

(87) PCT Pub. No.: WO2016/129211
PCT Pub. Date: Aug. 18, 2016

(65) Prior Publication Data
US 2018/0035287 A1  Feb. 1, 2018

(30) Foreign Application Priority Data
Feb. 10, 2015  (JP) .............................. JP2015-024502

(51) Int. Cl.
*H04W 12/04* (2009.01)
*H04W 12/06* (2021.01)
(Continued)

(52) U.S. Cl.
CPC ........ *H04W 12/04* (2013.01); *G06K 7/10722* (2013.01); *G06K 7/1413* (2013.01);
(Continued)

(58) Field of Classification Search
None
See application file for complete search history.

(56) References Cited

U.S. PATENT DOCUMENTS 7,124,953 B2  10/2006  Anttila et al.
8,340,169 B1  12/2012  Sarrigeorgidis
(Continued)

FOREIGN PATENT DOCUMENTS

CN    1835457 A    9/2006
CN   102595643 A    7/2012
(Continued)

OTHER PUBLICATIONS

Qualcomm Incorporated; "Addition of new WLAN interworking test case for Discovery of the Home Agent via DNS"; 3GPP TSG-RAN WG5 Meeting #46 R5-100065; Jan. 14, 2010.
(Continued)

*Primary Examiner* — Lynn D Feild
*Assistant Examiner* — Richard A McCoy
(74) *Attorney, Agent, or Firm* — Canon U.S.A., Inc. IP Division (57) ABSTRACT

The present invention relates to a communication apparatus including a first execution unit, a second execution unit, and a selection unit. The selection unit selects a first process of setting a wireless parameter in another communication apparatus or a second process of setting a wireless parameter that is set in another communication apparatus in the communication apparatus.

14 Claims, 8 Drawing Sheets

(51) Int. Cl.
*H04W 12/00* (2021.01)
*G06K 7/10* (2006.01)
*G06K 7/14* (2006.01)
*H04L 9/08* (2006.01)
*H04L 9/14* (2006.01)
*H04L 9/30* (2006.01)
*H04L 9/32* (2006.01)
*H04L 29/06* (2006.01)
*H04W 84/12* (2009.01)
*G06F 21/43* (2013.01)
*G06F 21/36* (2013.01)
*H04L 12/24* (2006.01)

(52) U.S. Cl.
CPC ............ *G06K 7/1417* (2013.01); *H04L 9/085* (2013.01); *H04L 9/0819* (2013.01); *H04L 9/14* (2013.01); *H04L 9/30* (2013.01); *H04L 9/3226* (2013.01); *H04L 63/062* (2013.01); *H04L 63/083* (2013.01); *H04W 12/003* (2019.01); *H04W 12/06* (2013.01); *G06F 21/36* (2013.01); *G06F 21/43* (2013.01); *H04L 41/0806* (2013.01); *H04W 12/00522* (2019.01); *H04W 84/12* (2013.01)

(56) References Cited

U.S. PATENT DOCUMENTS

| | | | |
|---|---|---|---|
| 8,823,494 B1 | 9/2014 | Kovitz et al. | |
| 8,838,080 B2* | 9/2014 | Ray | G06F 9/453 455/414.4 |
| 8,887,262 B1 | 11/2014 | Turner et al. | |
| 2006/0208088 A1 | 9/2006 | Sekiguchi | |
| 2008/0123557 A1* | 5/2008 | Elston | G06F 9/54 370/254 |
| 2011/0021180 A1 | 1/2011 | Ray | |
| 2013/0223279 A1 | 8/2013 | Tinnakornsrisuphap | |

FOREIGN PATENT DOCUMENTS

| | | |
|---|---|---|
| CN | 102860117 A | 1/2013 |
| CN | 103369714 A | 10/2013 |
| CN | 103701503 A | 4/2014 |
| CN | 104081677 A | 10/2014 |
| CN | 104137480 A | 11/2014 |
| JP | 2006-261938 A | 9/2006 |
| JP | 2012-244599 A | 12/2012 |
| JP | 2013153323 A | 8/2013 |
| JP | 2014-060623 A | 4/2014 |
| JP | 2014060623 A | 4/2014 |
| JP | 2014179884 A | 9/2014 |
| JP | 2014-230152 A | 12/2014 |
| KR | 20060100252 A | 9/2006 |
| KR | 10-2010-0007981 A | 1/2010 |
| RU | 113045 U1 | 1/2012 |
| WO | 2006/101065 A1 | 9/2006 |

OTHER PUBLICATIONS

Zijian, Zeng; "Research and Implementation Based on QR Code Two-dimensional Encoding and Decoding Technology"; www.cmfd.cnki.net; Mar. 15, 2011.

* cited by examiner

COMMUNICATION APPARATUS, METHOD OF CONTROLLING THE COMMUNICATION APPARATUS, AND PROGRAM

TECHNICAL FIELD

The present invention relates to a communication technology.

BACKGROUND ART

There are increasing cases in recent years, in which a wireless communication function is mounted in electronic devices including digital cameras, printers, mobile phones, or smart phones and these devices are connected to wireless networks for usage.

In order to connect the electronic devices to the wireless networks, it is necessary to set various wireless parameters, such as an encryption method, an encryption key, an authentication method, and an authentication key. PTL 1 is known as a technology to facilitate the setting of these wireless parameters. In PTL 1, a wireless parameter generated by an access point (hereinafter referred to as an AP) is encoded into a two-dimensional code and the AP displays the two-dimensional code on a screen. A terminal apparatus captures an image of the two-dimensional code displayed in the AP and decodes the two-dimensional code to set the wireless parameter. PTL 2 proposes a technology in which a terminal apparatus reads a Quick Response code (QR) code (registered trademark) that is displayed by an electronic device and that indicates a wireless parameter and causes an AP to set the wireless parameter that is read.

Setting the wireless parameter upon capturing an image of code information, such as the two-dimensional code, in which a lot of information can be encoded in the above manner reduces complicated inputs by a user. However, cases are not considered, in which multiple setting methods are capable of being performed upon capturing of an image of the code information. The multiple setting methods include the method of setting the wireless parameter in the terminal apparatus, as in PTL 1, and the method of setting the wireless parameter in the AP from the terminal apparatus, as in PTL 2. Accordingly, it is not possible to select any of the multiple setting methods in the setting of the wireless parameter upon capturing an image of the code information and perform the selected setting method.

CITATION LIST

Patent Literature

PTL 1: Japanese Patent Laid-Open No. 2006-261938
PTL 2: Japanese Patent Laid-Open No. 2014-60623
PTL 3: Japanese Patent Laid-Open No. 2014-230152

SUMMARY OF INVENTION

Solution to Problem

The present invention provides a communication apparatus including a first execution unit that performs a first process of setting a wireless parameter for wireless communication in another communication apparatus by the communication apparatus on the basis of information that is necessary for setting the wireless parameter and that is included in information acquired from an image that is captured; a second execution unit that performs a second process of setting a wireless parameter for wireless communication, which is set in another communication apparatus, in the communication apparatus on the basis of information that is necessary for setting the wireless parameter and that is included in information acquired from an image that is captured; and a selection unit configured to select the first process or the second process to be performed on the basis of information acquired from an image that is captured.

Further features of the present invention will become apparent from the following description of exemplary embodiments with reference to the attached drawings.

DESCRIPTION OF EMBODIMENTS

Embodiments described below are provided to perform a process selected from multiple wireless parameter setting processes based on information that is necessary for setting wireless parameters and that is included in information resulting from analysis of an image that is captured.

First Embodiment

Figure 3:
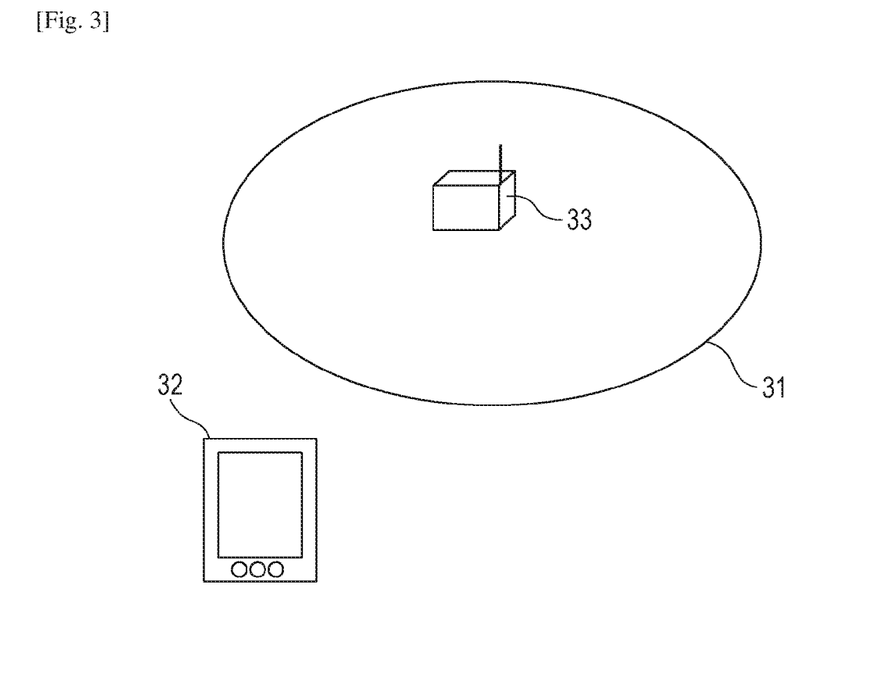
FIG. 3 illustrates an exemplary configuration of a communication system in the first embodiment.

FIG. 3 illustrates an exemplary configuration of a communication system according to a first embodiment. Referring to FIG. 3, the communication system includes a mobile phone 32 and an access point (hereinafter referred to as an AP) 33. The AP 33 builds a wireless local area network (LAN) 31. In the first embodiment, the wireless LAN 31 illustrated in FIG. 3 conforms to The Institute of Electrical and Electronics Engineers Inc. (IEEE) 802.11 series. However, the communication mode is not necessarily limited to the wireless LAN conforming to the IEEE 802.11 series.

In the first embodiment, the AP 33 operates as an access point in an infrastructure mode defined in an IEEE 802.11 standard. The AP 33 composes a wireless network and performs authentication and encryption for a station (STA), management of the STA, and so on. The mobile phone 32 operates as a STA in the infrastructure mode defined in the IEEE 802.11 standard.

Although the apparatus in the communication system in the first embodiment is exemplified by the mobile phone, the apparatus in the communication system may be another apparatus, such as a printer, a digital camera, a personal computer (PC), a video camera, a smart watch, or a Personal Digital Assistant (PDA).

Figure 1:
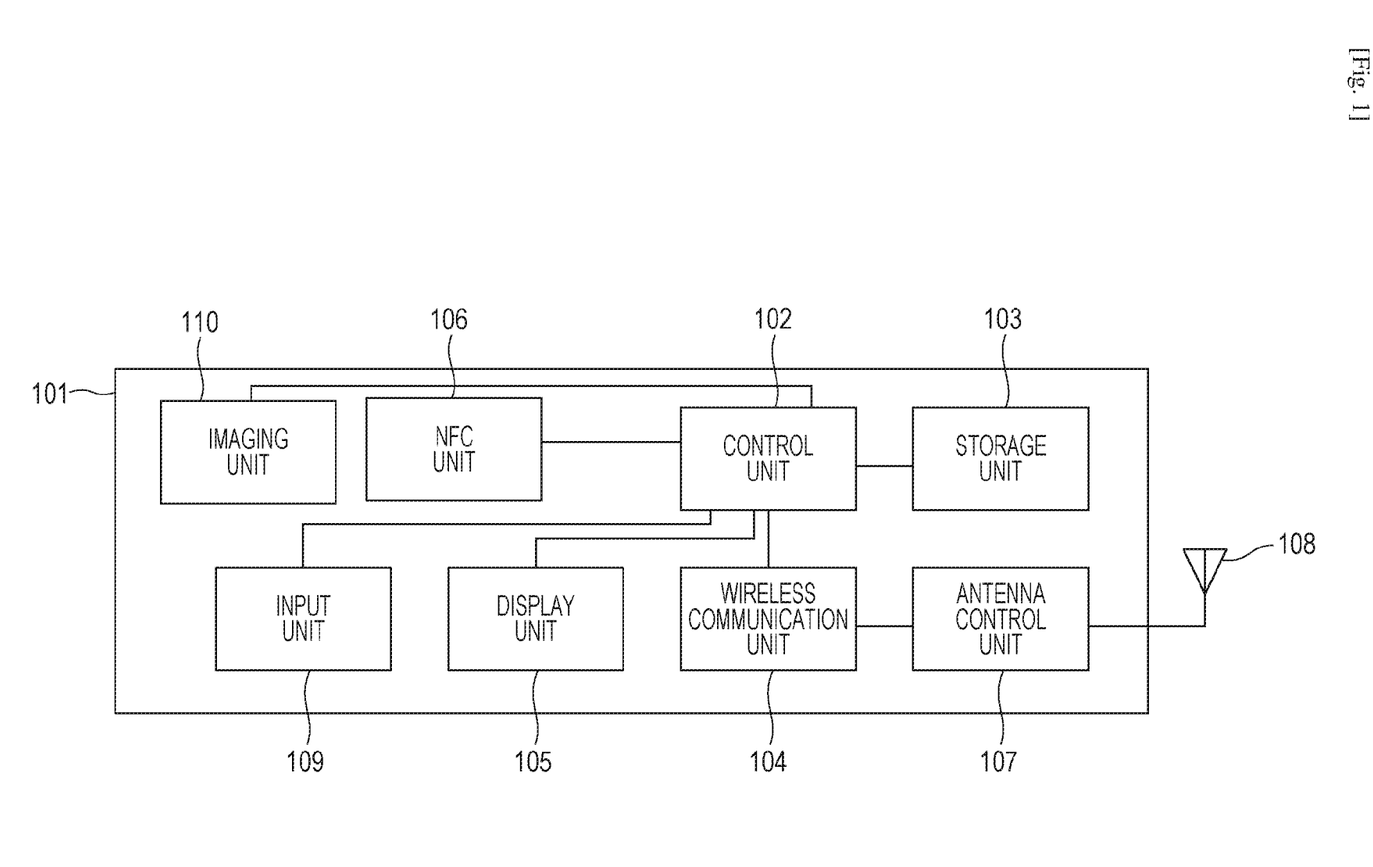
FIG. 1 is a block diagram illustrating an exemplary hardware configuration of a communication apparatus in a first embodiment.

FIG. 1 is a block diagram illustrating an exemplary hardware configuration of the apparatus in the first embodiment. Although the configuration of the mobile phone 32 is described with reference to FIG. 1, a description of the configuration of the AP 33 is omitted herein because the AP 33 has the same configuration as that of the mobile phone 32. Referring to FIG. 1, reference numeral 101 denotes the entire apparatus. The apparatus 101 includes a control unit 102, a storage unit 103, a wireless communication unit 104, a display unit 105, a Near Field Communication (NFC) unit 106, an antenna control unit 107, an antenna 108, an input unit 109, and an imaging unit 110. The control unit 102 executes a control program stored in the storage unit 103 to control the entire apparatus. The control unit 102 is composed of, for example, a central processing unit (CPU). The storage unit 103 stores a variety of information, such as the control program executed by the control unit 102, image data, and wireless parameters. Various operations described below are performed by the control unit 102 that executes the control program stored in the storage unit 103. The storage unit 103 is composed of a storage medium, such as a hard disk drive (HDD), a flash memory, or a removable Secure Digital (SD) card.

The wireless communication unit 104 performs wireless LAN communication conforming to the IEEE 802.11 series. The wireless communication unit 104 is composed of a chip that performs the wireless communication. The display unit 105 performs a variety of display and has a function to output information that is visually perceptive, like a liquid crystal display (LCD) and a light emitting diode (LED), and/or an audio output function, like a speaker. The display unit 105 has the function to output at least one of visual information and audio information. When the display unit 105 displays the visual information, the display unit 105 includes a video random access memory (VRAM) that holds image data corresponding to the visual information to be displayed. The display unit 105 performs display control in which the image data stored in the VRAM is continuously displayed in the LCD or the LED.

The NFC unit 106 performs NFC. The NFC unit 106 performs wireless communication conforming to a communication standard defined by NFC Forum. The NFC unit 106 may adopt, for example, a Bluetooth Low Energy (BLE) mode defined in Bluetooth (registered trademark) 4.0. The NFC unit 106 may perform other shortdistance wireless communication, such as infrared communication or TransferJet (registered trademark).

The antenna control unit 107 performs output control of the antenna 108. The antenna 108 is used to perform the wireless LAN communication and is capable of communication in a 2.4-GHz band and/or a 5-GHz band. The input unit 109 is used by a user to perform various inputs in order to operate the communication apparatus 101. The input unit 109 stores a flag corresponding to an input by the user in a memory, such as the storage unit 103. The imaging unit 110 is composed of an image pickup device, a lens, and so on and takes a picture and a movie. The imaging unit 110 performs, for example, reading of code information, such as a barcode, a two-dimensional code, and a QR code, in which information is encoded.

Figure 2:
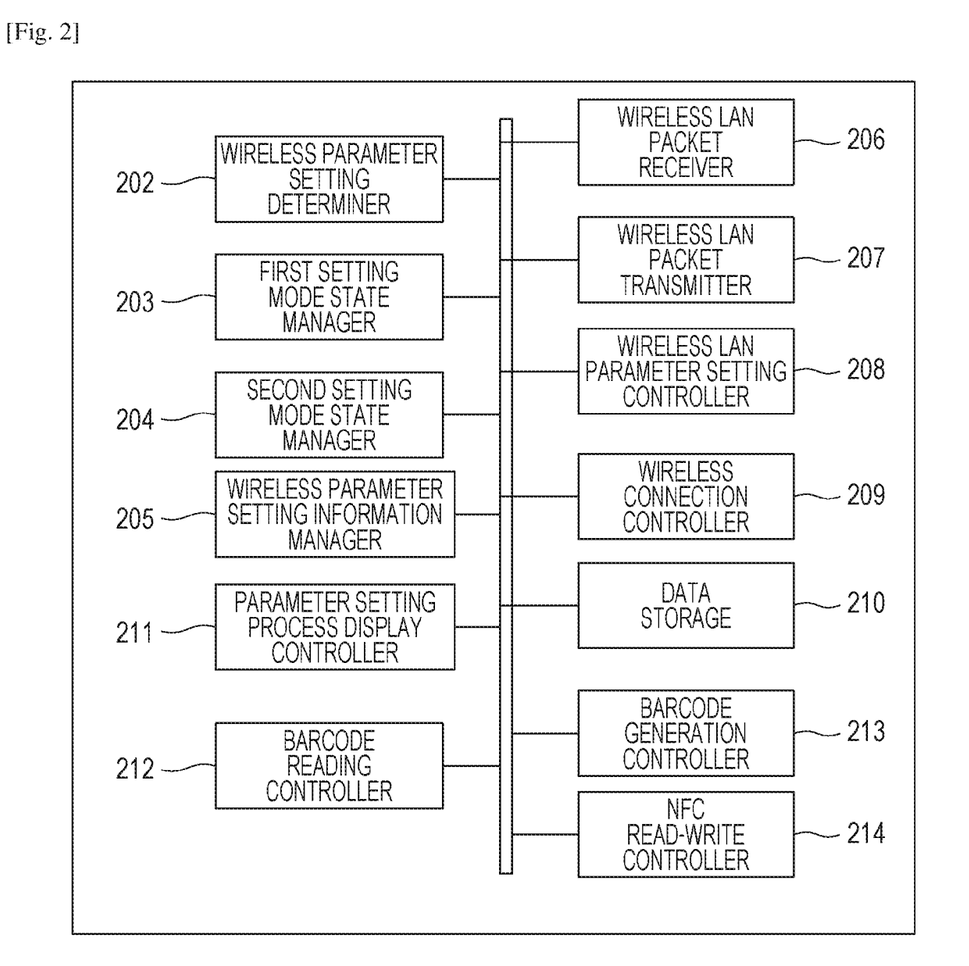
FIG. 2 is a block diagram illustrating an exemplary functional software configuration of the communication apparatus.

FIG. 2 is a block diagram illustrating an exemplary configuration of software functional blocks that perform a communication control function described below. In the first embodiment, the functional blocks in the mobile phone 32 are stored in the storage unit 103 as programs and the functions of the functional blocks are performed by the control unit 102 that executes the programs. The control unit 102 performs control of hardware and operation and processing of information in accordance with the control program to realize the respective functions. Part or all of the functional blocks may be realized by hardware. In this case, part or all of the functional blocks are composed of, for example, Application Specific Integrated Circuits (ASICs).

Referring to FIG. 2, reference numeral 202 denotes a wireless parameter setting determiner. The wireless parameter setting determiner 202 selects a setting mode of a wireless parameter automatic setting process performed by the mobile phone 32. The mobile phone 32 is capable of performing multiple setting modes. The wireless parameter automatic setting process is a process of automatically setting wireless parameters between apparatuses. For example, the wireless parameter automatic setting process provides the wireless parameters that are transmitted through the wireless communication from a provision apparatus to a reception apparatus. The wireless parameters are pieces of information necessary for the wireless communication and include pieces of information, such as a Service Set Identifier (SSID) serving as a network identifier, an encryption method, an encryption key, an authentication method, and an encryption key, which is necessary for the wireless LAN communication. In addition, the wireless parameters may include a Media Access Control (MAC) address, a passphrase, an Internet protocol (IP) address for communication on an IP layer, information necessary for high-level services, and so on.

In a first wireless parameter setting mode which can be performed by the mobile phone 32, switching is available between a first method in which the mobile phone 32 sets the wireless parameters for a communication partner apparatus and a second method in which the communication partner apparatus sets the wireless parameters for the mobile phone 32.

In the first method, the mobile phone 32 captures an image of a QR code that is displayed in another apparatus or that is associated with another apparatus. The QR code associated with another apparatus is a QR code attached to a case of the other apparatus or a QR code described in an instruction manual of the apparatus. The mobile phone 32 acquires information that is included in the read-out QR code and that is necessary for setting the wireless parameters. The information necessary for setting the wireless parameters includes, for example, the wireless parameters themselves, identification information about the apparatus, and identification information about the wireless parameter automatic setting process.

Then, the mobile phone 32 acquires the identification information about the apparatus, which is included in the QR code that is read out. The identification information about the apparatus may be a MAC address or a Universally Unique Identifier (UUID) for uniquely identifying the apparatus. The mobile phone 32 transmits the wireless parameters set in the mobile phone 32 to the apparatus indicated by the identification information acquired from the QR code. In the transmission of the wireless parameters, the wireless parameters encrypted using a public key or a certificate may be communicated between the apparatuses. The public key may be included in the QR code. A method of encrypting the wireless parameters using the public key is disclosed in, for example, PTL 3.

Upon reception of the wireless parameters, the communication partner apparatus builds a wireless network on the basis of the wireless parameters. The mobile phone 32 establishes the wireless connection with the apparatus indicated by the identification information acquired from the QR code on the basis of the wireless parameters which the mobile phone 32 has transmitted.

In the second method, the mobile phone 32 captures an image of a QR code that is displayed in another apparatus or that is associated with another apparatus. The mobile phone 32 acquires information that is included in the read-out QR code and that is necessary for setting the wireless parameters. The information necessary for setting the wireless parameters includes, for example, the wireless parameters themselves, the identification information about the apparatus, and the identification information about the wireless parameter automatic setting process.

Then, the mobile phone 32 acquires the identification information about the apparatus, which is included in the QR code that is read out. The identification information about the apparatus may be a MAC address or a UUID for uniquely identifying the apparatus. The mobile phone 32 requests the wireless parameters of the apparatus indicated by the identification information acquired from the QR code. The mobile phone 32 then receives the wireless parameters from the apparatus indicated by the identification information acquired from the QR code. In the transmission of the wireless parameters, the wireless parameters encrypted using a public key or a certificate may be communicated between the apparatuses. The public key may be included in the QR code. A method of encrypting the wireless parameter using the public key is disclosed in, for example, PTL 3. Upon reception of the wireless parameters, the mobile phone 32 connects to the wireless network on the basis of the wireless parameters.

In a second wireless parameter setting mode which can be performed by the mobile phone 32, the mobile phone 32 acquires the wireless parameters from the communication partner apparatus through the wireless communication. The second wireless parameter setting mode is the wireless parameter automatic setting process without the image capturing and may be, for example, Wi-Fi Protected Setup (WPS) or Wi-Fi Direct, which is defined by Wi-Fi Alliance.

Referring back to FIG. 2, reference numeral 203 denotes a first setting mode state manager. The first setting mode state manager 203 manages the setting status of the first setting mode when the access point or the communication partner apparatus supports the first setting mode. Reference numeral 204 denotes a second setting mode state manager. The second setting mode state manager 204 manages the setting status of the second setting mode when the access point or the communication partner apparatus supports the second setting mode.

Reference numeral 205 denotes a wireless parameter setting information manager. The wireless parameter setting information manager 205 stores the acquired wireless parameters in the storage unit 103 in association with the access point or the communication partner apparatus. The wireless parameter setting information manager 205 generates the wireless parameters to be set for the access point or the communication partner apparatus. Reference numeral 206 denotes a wireless LAN packet receiver and reference numeral 207 denotes a wireless LAN packet transmitter. The wireless LAN packet receiver 206 and the wireless LAN packet transmitter 207 each establish the wireless LAN communication conforming to the IEEE 802.1.1 standard with the communication partner apparatus.

Reference numeral 208 denotes a wireless LAN parameter setting controller. The wireless LAN parameter setting controller 208 performs secure control of setting of wireless parameter information in accordance with the protocol or the encryption and authentication methods corresponding to the setting mode. The wireless LAN parameter setting controller 208 performs the wireless parameter automatic setting process in the first setting mode or the second setting mode described above.

Reference numeral 209 denotes a wireless connection controller. The wireless connection controller 209 provides a STA function and an AP function defined in the IEEE 802.11 standard. Reference numeral 210 denotes a data storage. The data storage 210 controls writing and reading of the software and information about the wireless parameters and the barcode or the like into and from the storage unit 103. Reference numeral 211 denotes a parameter setting process display controller. The parameter setting process display controller 211 displays a variety of information including error display control in the wireless parameter automatic setting process and the progress situation of the wireless parameter automatic setting process.

Reference numeral 212 denotes a barcode reading controller. The barcode reading controller 212 analyzes an image captured by the imaging unit 110 and acquires encoded information from the result of the analysis. The barcode reading controller 212 analyzes the code information, such as the barcode, the two-dimensional code, or the QR code. Reference numeral 213 denotes a barcode generation controller. The barcode generation controller 213 generates the barcode, the two-dimensional code, or the QR code and controls display of the generated barcode or the like in the display unit 105. Reference numeral 214 denotes an NFC Read-Write controller. The NFC Read-Write controller 214 writes and reads information into and from the communication partner apparatus via the NFC unit 106.

The above functional blocks are only examples. Multiple functional blocks may compose one functional block or any of the functional blocks may be divided into multiple functional blocks.

Figure 4:
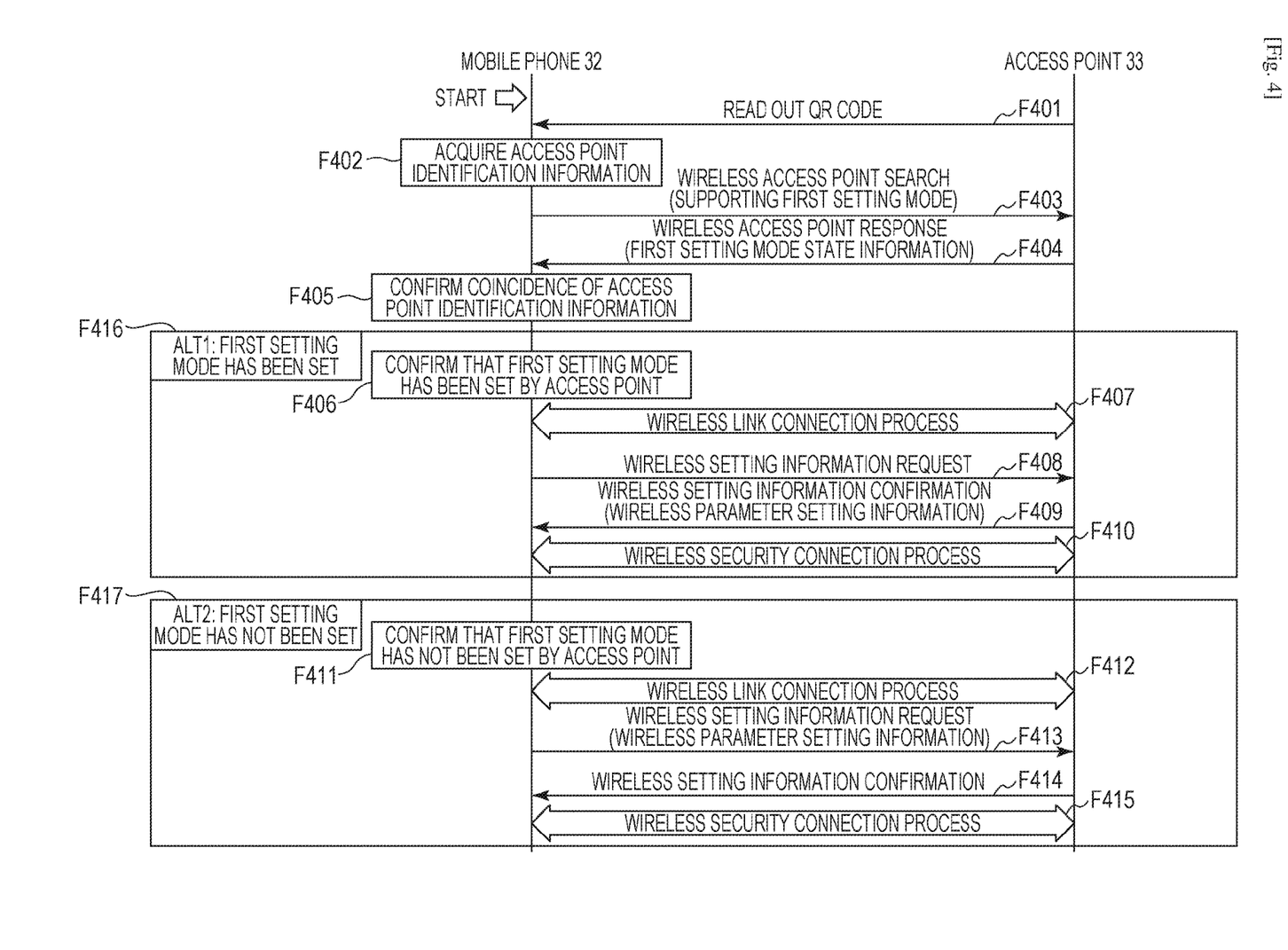
FIG. 4 illustrates an exemplary connection sequence in the communication system.

An exemplary operation of the communication system having the above configuration will now be described. FIG. 4 illustrates an exemplary connection sequence in setting of communication between the communication apparatuses: the mobile phone 32 and the AP 33.

Referring to FIG. 4, the mobile phone 32 starts the process upon reception of an instruction to start the wireless parameter automatic setting process from the user with the input unit 109. In F401, the mobile phone 32 captures an image of the QR code displayed in or attached to the AP 33 with the imaging unit 110. The QR code may not be displayed in the display unit of the AP 33 (may be displayed on a setup screen of a Web browser) or may not be electronically displayed. The QR code may be described in an instruction manual or another medium.

In F402, the mobile phone 32 decodes the QR code and determines whether the content of the QR code is the information necessary for setting the wireless parameters. The information necessary for setting the wireless parameters includes, for example, the wireless parameters themselves, the identification information about the apparatus, and the identification information about the wireless parameter automatic setting process. The information necessary for setting the wireless parameters may be identification information about, for example, a one-time password method using the QR code. If the QR code does not include the information necessary for setting the wireless parameters, the mobile phone 32 may perform error termination or may capture an image of the QR code again.

If the mobile phone 32 determines that the content of the QR code is the information necessary for setting the wireless parameters, in F403, the mobile phone 32 transmits a search signal specifying the apparatus identified by the identifier in the QR code to the AP 33 with the wireless communication unit 104. This search signal may be a probe request defined in the IEEE 802.11. The identification information about the wireless parameter automatic setting process or information indicating that the wireless parameter automatic setting process is being activated may be added to the search signal. The executable setting mode of the wireless parameters may be added to the search signal.

Upon reception of the search signal from the mobile phone 32, in F404, the AP 33 returns a response signal. This response signal may be a probe response defined in the IEEE 802.11. The response signal includes information indicating that the AP 33 supports the first wireless parameter setting mode and information indicating whether the wireless parameters in the first setting mode has been set or has not been set. The case in which the wireless parameters have been set corresponds to, for example, a case in which the wireless parameters have already been set by another communication apparatus.

The case in which the wireless parameters have not been set corresponds to, for example, a case in which the AP 33 is set to factory default values or a case in which the wireless parameter information that is set is deleted. In addition, when the AP 33 requests the setting of the wireless parameters, for example, in a case in which the AP 33 automatically detects a security risk or in a case in which the AP 33 wants to temporarily change the wireless parameters, the information indicating that the wireless parameters has not been set is added to the response signal.

In F405, the mobile phone 32 confirms whether the identification information about the apparatus acquired from the QR code in F401 coincides with the identification information about the source of the response signal. Then, the mobile phone 32 switches the processing on the basis of whether the wireless parameters have been set. If the AP 33 has set the wireless parameters, in F416, the mobile phone 32 acquires the wireless parameters from the AP 33 using the second method described above. If the AP 33 has not set the wireless parameters, in F417, the mobile phone 32 sets the wireless parameters in the AP 33 using the first method described above.

F416 will now be described in detail. In F406, the mobile phone 32 confirms that the AP 33 has set the wireless parameters. In F407, the mobile phone 32 performs a wireless link connection process of establishing a wireless link connection with the AP 33 with the wireless communication unit 104. The security of the wireless link in F407 is low because the mobile phone 32 and the AP 33 do not set common wireless parameters.

In F408, the mobile phone 32 transmits a wireless setting information request signal to request the wireless parameters to the AP 33 with the wireless communication unit 104. Upon reception of the wireless setting information request signal, in F409, the AP 33 transmits a wireless setting information confirmation signal including the wireless parameters (wireless parameter setting information) set in the AP 33. The wireless parameters encrypted using a public key or a certificate may be transmitted in F409. A method of encrypting the wireless parameters using a public key is disclosed in, for example, PTL 3. The transmission of the wireless parameters that are encrypted using a public key allows the wireless parameters to be securely shared even if the security of the wireless link is low.

In F410, the mobile phone 32 performs a wireless security connection process with the AP 33 using the wireless parameters. The security of the wireless link in F410 is high because the mobile phone 32 and the AP 33 set the common wireless parameters and, thus, encrypted communication is enabled.

F417 will now be described in detail. In F411, the mobile phone 32 confirms that the AP 33 has not set the wireless parameters. In F412, the mobile phone 32 performs the wireless link connection process with the AP 33 with the wireless communication unit 104. The security of the wireless link in F412 is low because the mobile phone 32 and the AP 33 do not set common wireless parameters.

In F413, the mobile phone 32 transmits to the AP 33 the wireless setting information request signal to cause the AP 33 to set the wireless parameters. The wireless setting information request signal in F413, which differs from the wireless setting information request signal in F408, includes the wireless parameters (the wireless parameter setting information) which the mobile phone 32 causes the AP 33 to set. As in F409, the wireless parameters encrypted using a public key may be transmitted.

In F414, the mobile phone 32 receives the wireless setting information confirmation signal, which is a response to the request signal in F413, from the AP 33 and confirms that the setting of the wireless parameters in the AP 33 is completed. In F415, the mobile phone 32 performs the wireless security connection process with the AP 33 using the wireless parameters set in the AP 33.

As described above, the mobile phone 32 is capable of selecting either of the acquisition of the wireless parameters from the AP 33 or the setting of the wireless parameters in the AP 33 in accordance with the setting status of the wireless parameters in the AP 33.

Figure 5A:
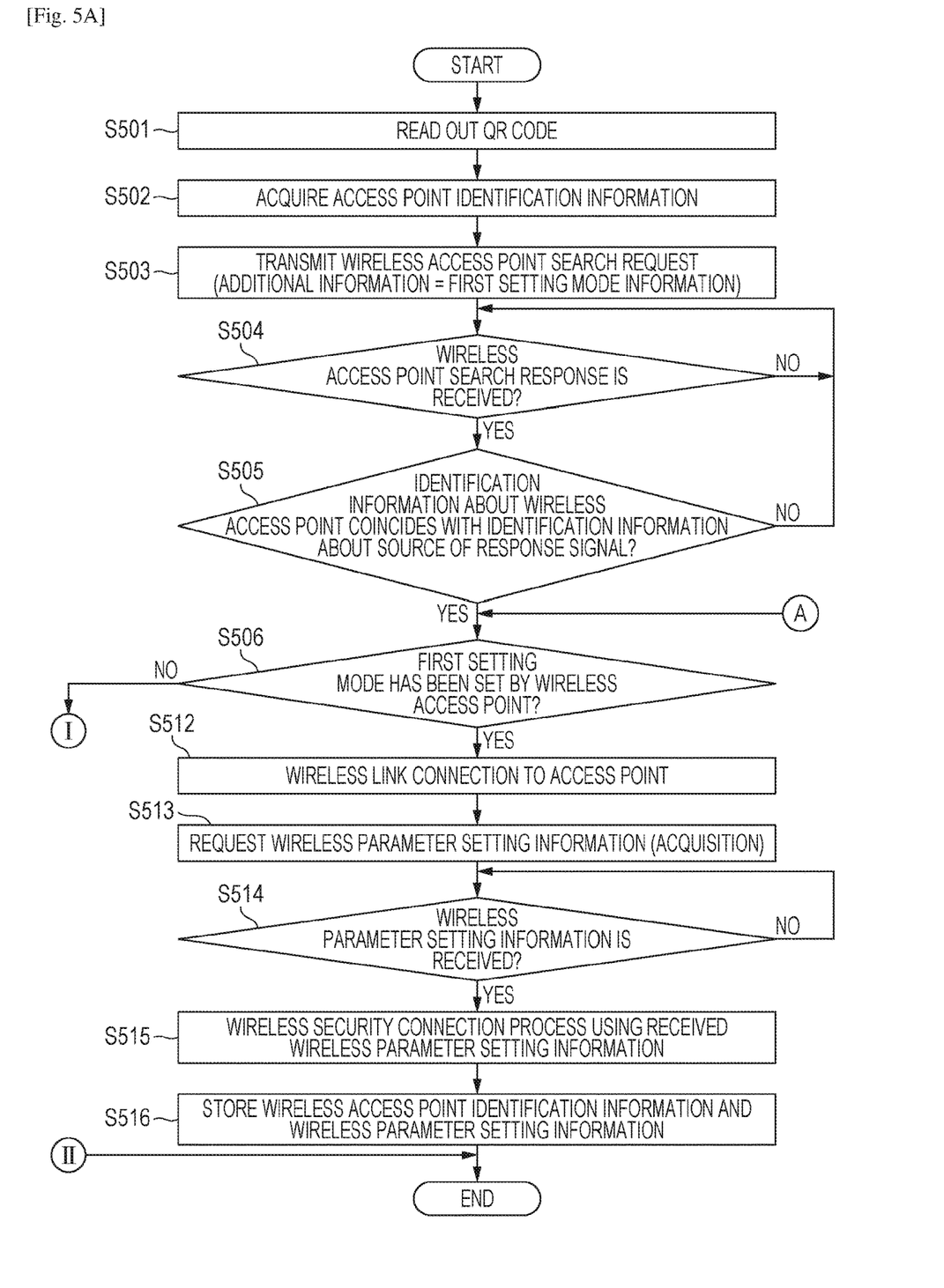
FIG. 5A is a flowchart illustrating an exemplary operation of the communication apparatus in the first embodiment.
Figure 5B:
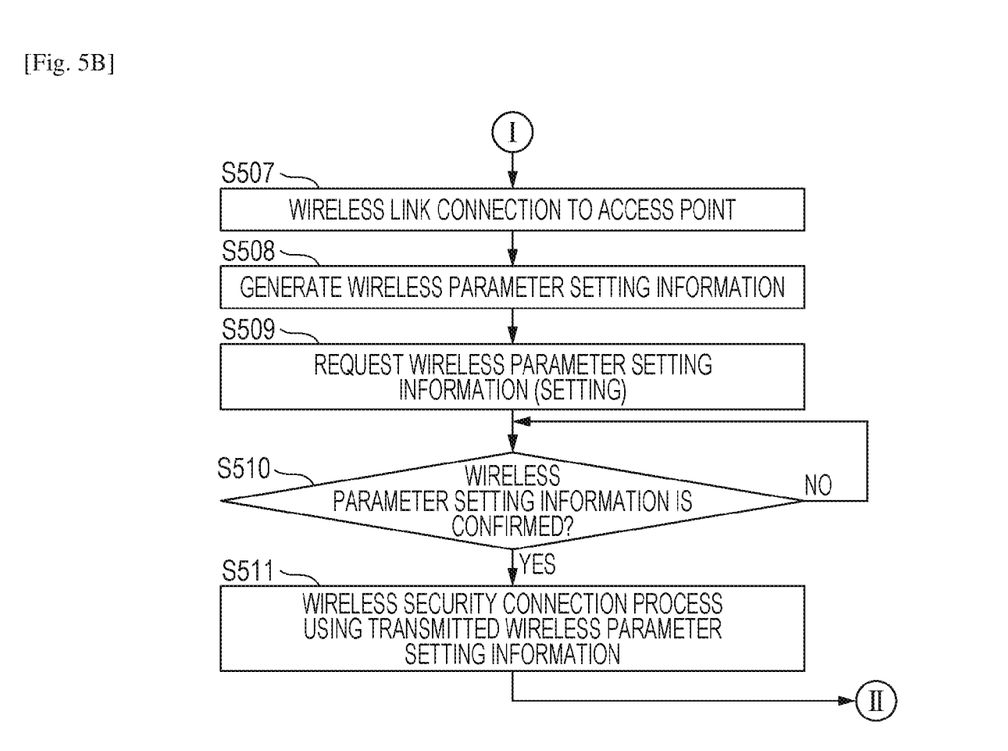
FIG. 5B is a flowchart illustrating the exemplary operation of the communication apparatus in the first embodiment.

An exemplary operational process performed by the mobile phone 32 in the first embodiment will now be described with reference to FIGS. 5A and 5B. FIGS. 5A and 5B are flowcharts when the mobile phone 32 performs the wireless parameter automatic setting process in the first setting mode. The operational process in the flowcharts in FIGS. 5A and 5B is started upon reception of the instruction to start the wireless parameter automatic setting process from the user with the input unit 109. The operational process in the flowcharts in FIGS. 5A and 5B is performed by the control unit 102 that reads out the computer program stored in the storage unit 103 and executes the computer program that is read out. Part or all of the steps in the flowcharts illustrated in FIGS. 5A and 5B may be realized by hardware, such as ASICs.

Referring to FIGS. 5A and 5B, in Step S501, the mobile phone 32 captures an image of the QR code with the imaging unit 110 in response to an operation by the user with the input unit 109. The mobile phone 32 reads out decoded data about the QR code and determines whether the information necessary for setting the wireless parameters is included in the decoded data. When the information necessary for setting the wireless parameters is not included in the decoded data, the mobile phone 32 may perform the error termination or may capture an image of the QR code again.

When the information necessary for setting the wireless parameters is included in the QR code, in Step S502, the mobile phone 32 acquires the identification information about the apparatus from the QR code. In Step S503, the mobile phone 32 transmits the search signal specifying the access point identified by the identification information in the QR code with the wireless communication unit 104. Information about the first setting mode is included in the search signal as additional information. The additional information is used to limit the search to the access point supporting the first setting mode or the access point identified by the identification information.

In Step S504, the mobile phone 32 waits for reception of the response signal from the access point. Upon reception of the response signal with the wireless communication unit 104, in Step S505, the mobile phone 32 confirms whether the identification information about the source of the response signal coincides with the identification information about the apparatus acquired from the QR code. If the mobile phone 32 confirms that the identification information about the source of the response signal does not coincide with the identification information about the apparatus acquired from the QR code (NO in Step S505), the process goes back to Step S504 to further wait for the response signal.

If the mobile phone 32 confirms that the identification information about the source of the response signal coincides with the identification information about the apparatus acquired from the QR code (YES in Step S505), in Step S506, the mobile phone 32 determines whether the access point from which the response signal is transmitted has set the wireless parameters on the basis of the information included in the response signal.

If the mobile phone 32 determines that the access point from which the response signal is transmitted has set the wireless parameters (YES in Step S506), the mobile phone 32 selects the setting of the wireless parameters in the second method. In S512, the mobile phone 32 establishes the wireless link connection with the source of the response signal with the wireless communication unit 104 in order to set the wireless parameters in the second method. In Step S513, the mobile phone 32 transmits the wireless setting information request signal to request the wireless parameters to the source of the response signal with the wireless communication unit 104. In Step S514, the mobile phone 32 determines whether the wireless setting information confirmation signal including the wireless parameters, which is the response signal to the request signal transmitted in Step S513, is received.

Upon reception of the wireless setting information confirmation signal including the wireless parameters, in Step S515, the mobile phone 32 establishes the wireless security connection with the wireless communication unit 104 in accordance with the SSID, the encryption and authentication methods, and the key information included in the received wireless parameters. In Step S516, the mobile phone 32 stores the identification information about the communication partner apparatus and the wireless parameter setting information in the storage unit 103 for use in reconnection.

If the mobile phone 32 determines that the access point from which the response signal is transmitted has not set the wireless parameters (NO in Step S506), the mobile phone 32 selects the setting of the wireless parameters in the first method. In S507, the mobile phone 32 establishes the wireless link connection with the source of the response signal with the wireless communication unit 104 in order to set the wireless parameters in the first method. In Step S508, the mobile phone 32 generates the wireless parameters (the wireless parameter setting information) to be set in the communication partner apparatus.

The wireless parameters generated in Step S508 may be the wireless parameters generated in random. The wireless parameters generated in Step S508 may be generated on the basis of information input by the user with the input unit 109. The wireless parameters generated in Step S508 may be the wireless parameters selected by the user with the input unit 109 from the wireless parameters displayed in the display unit 105, which are stored in advance in the storage unit 103. The wireless parameters stored in advance in the storage unit 103 may be the wireless parameters for connection to the wireless network or the communication partner apparatus to which the mobile phone 32 has connected.

In Step S509, the mobile phone 32 transmits the wireless setting information request signal to request the wireless parameters to the communication partner apparatus. The wireless setting information request signal in Step S509 includes the wireless parameters generated in Step S508. The wireless parameters encrypted using a public key may be transmitted in Step S509. In Step S510, the mobile phone 32 determines whether the wireless setting information confirmation signal indicating that the wireless parameters are received, which is the response signal to the request signal transmitted in Step S509, is received.

Upon reception of the wireless setting information confirmation signal, in Step S511, the mobile phone 32 performs the wireless security connection process using the wireless parameters set in the communication partner apparatus.

As described above, the mobile phone 32 is capable of switching between the reception of the wireless parameters from the communication partner apparatus and the setting of the wireless parameters in the communication partner apparatus on the basis of the response signal to the search signal. Accordingly, for example, the mobile phone 32 is capable of determining whether initial setup of the access point is to be performed or the mobile phone 32 is to connect to the access point subjected to the initial setup and performing the process corresponding to the result of the determination.

Figure 6:
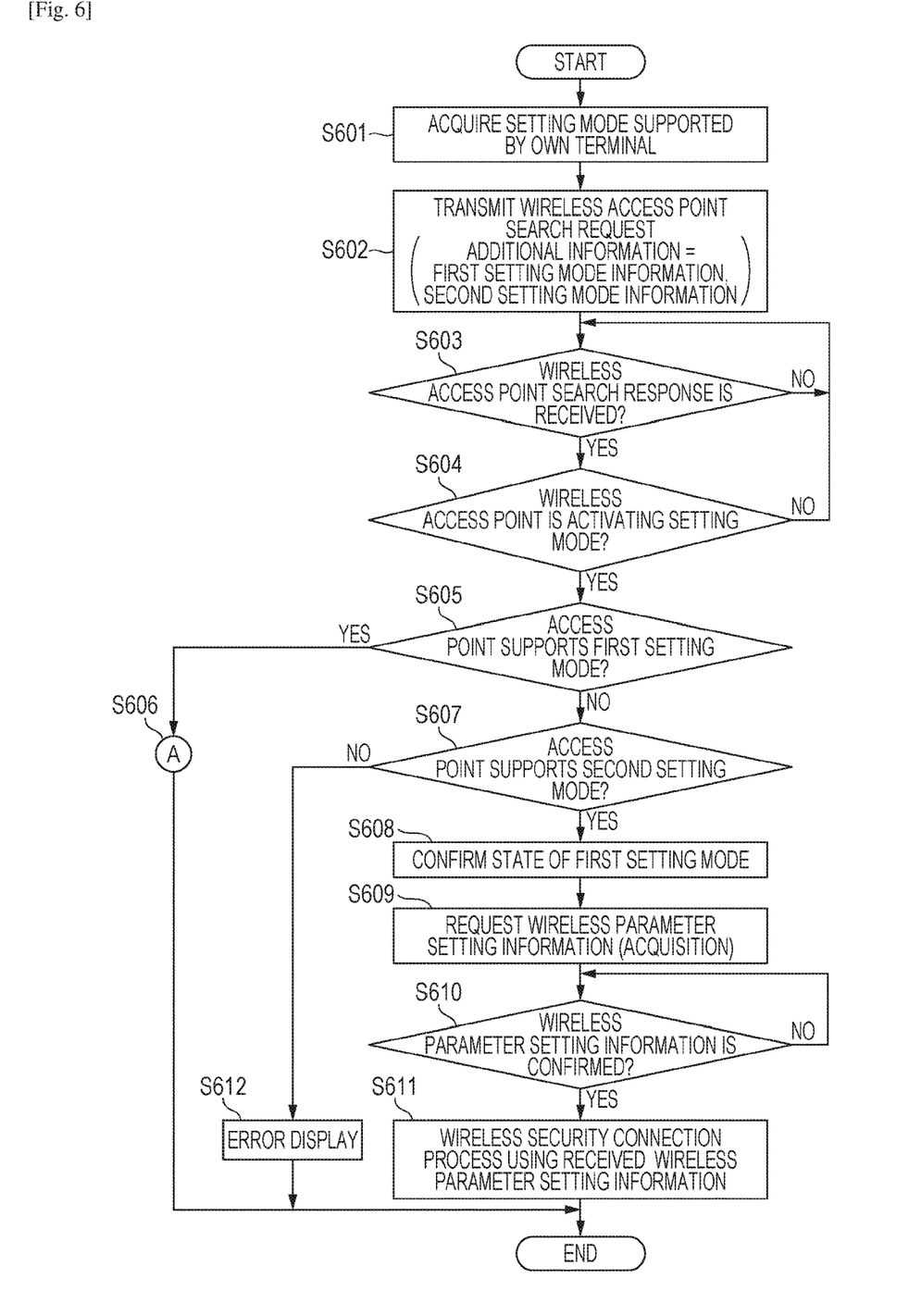
FIG. 6 is a flowchart illustrating another exemplary operation of the communication apparatus in the first embodiment.

A process of selecting the mode from the first setting mode and the second setting mode described above by the mobile phone 32 will now be described with reference to a flowchart in FIG. 6. The flowchart in FIG. 6 is started upon reception of the instruction to start the wireless parameter automatic setting process from the user with the input unit 109. The process in the flowchart in FIG. 6 is performed by the control unit 102 that reads out the computer program stored in the storage unit 103 and executes the computer program that is read out. Part or all of the steps in the flowchart illustrated in FIG. 6 may be realized by hardware, such as ASICs.

Referring to FIG. 6, in Step S601, the mobile phone 32 acquires the setting mode which the mobile phone 32 supports and confirms that the mobile phone 32 supports the first setting mode or the second setting mode. In Step S602, the mobile phone 32 transmits the search signal used to search for the access point. Here, information about the first setting mode and the second setting mode is included in the signal transmitted in Step S602 as the additional information in order to search for the access point supporting the first setting mode or the second setting mode.

In Step S603, the mobile phone 32 waits for reception of the response signal from the access point. Upon reception of the response signal with the wireless communication unit 104, in Step S604, the mobile phone 32 determines whether the source of the response signal is activating the wireless parameter automatic setting process. If information indicating that the wireless parameter automatic setting process is being activated is not included in the received response signal (NO in Step S604), the process goes back to Step S603 to further wait for the response signal.

If the information indicating that the wireless parameter automatic setting process is being activated is included in the received response signal (YES in Step S604), in Step S605 and Step S607, the mobile phone 32 determines the mode of the wireless parameter automatic setting process which the source of the response signal is activating. If the source of the response signal does not support the first setting mode nor the second setting mode, in Step S612, the mobile phone 32 notifies the user of an error with the display unit 105. Then, the process illustrated in FIG. 6 is terminated.

If it is determined that the source of the response signal is activating the first setting mode on the basis of the received response signal, in Step S606, the process goes to A in FIG. 5A to perform the processing in the first setting mode. Since the processing in the first setting mode is described in detail above, a description of the processing is omitted herein. Although the first setting mode is performed in preference to the second setting mode, the second setting mode may be performed in preference to the first setting mode.

If it is determined that the source of the response signal is not activating the first setting mode but is activating the second setting mode on the basis of the received response signal, the mobile phone 32 determines that the mobile phone 32 performs the second setting mode. In Step S608, the mobile phone 32 confirms the setting state indicating whether the wireless parameter information in the first setting mode is set by another apparatus in the source of the response signal on the basis of the content of the response signal.

If the wireless parameter information in the first setting mode is not set in the source of the response signal, the mobile phone 32 displays in the display unit 105 a fact that a security problem occurs because the wireless parameters in the initial state are set. The mobile phone 32 may cause the user to determine whether the subsequent processing is to be continued when the wireless parameter information in the first setting mode is not set in the source of the response signal.

In Step S609, the mobile phone 32 transmits the wireless setting information request signal to request the wireless parameters to the AP 33 with the wireless communication unit 104. In Step S610, the mobile phone 32 determines whether the wireless setting information confirmation signal including the wireless parameters, which is the response signal to the request signal transmitted in Step S609, is received.

Upon reception of the wireless setting information confirmation signal including the wireless parameters, in Step S611, the mobile phone 32 establishes the wireless security connection with the wireless communication unit 104 in accordance with the SSID, the encryption and authentication methods, and the key information included in the received wireless parameters.

As described above, the mobile phone 32 is capable of selecting an appropriate mode corresponding to the state of the access point from the multiple modes of the wireless parameter automatic setting process on the basis of the content of the response signal from the access point.

Second Embodiment

A process of updating the wireless parameters by the mobile phone 32 for an access point in which the wireless parameters are in the initial setup state and which has a security problem to improve the security will now be described in a second embodiment. The configuration of each apparatus in the second embodiment is the same as that in the first embodiment.

Figure 7:
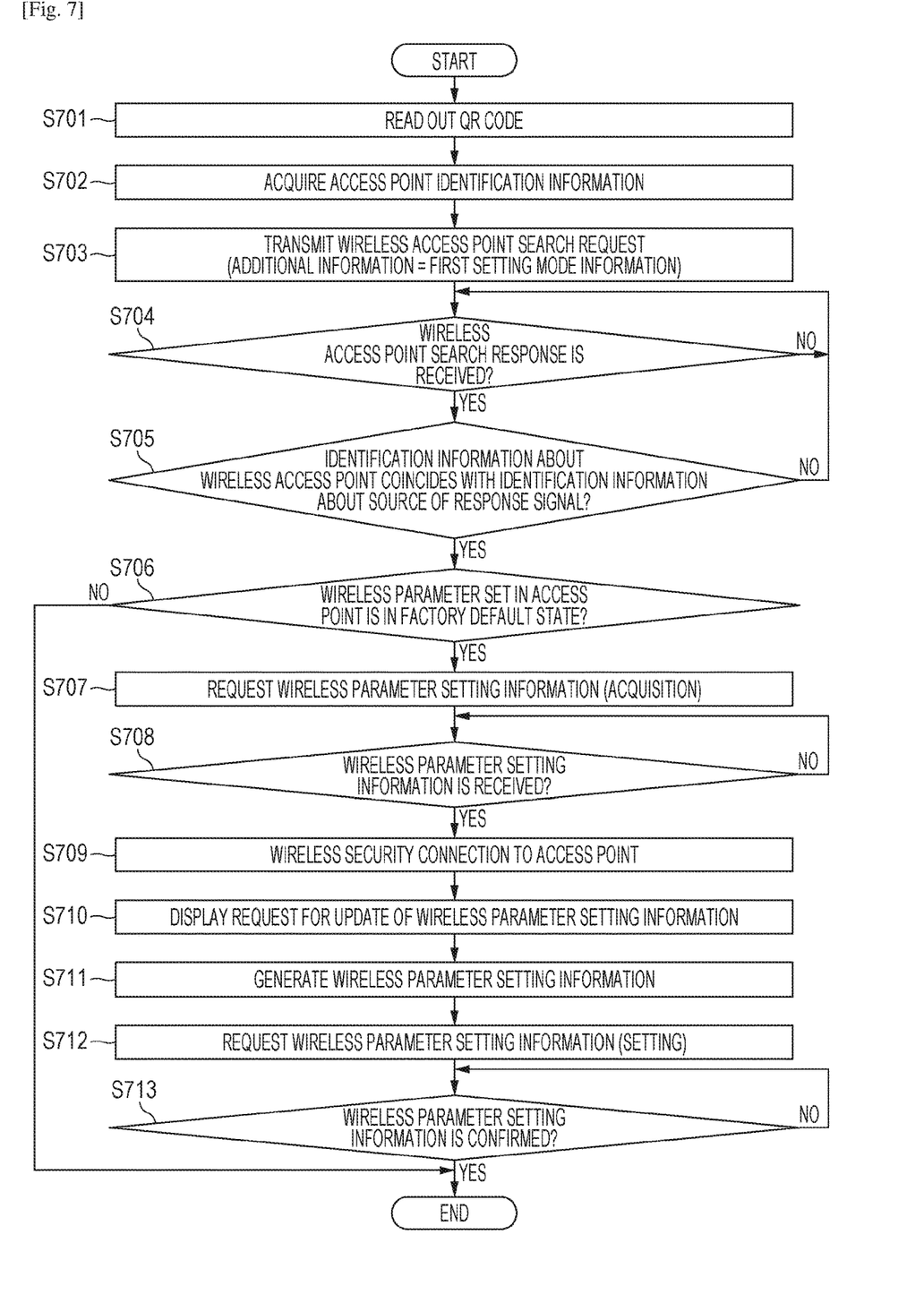
FIG. 7 is a flowchart illustrating an exemplary operation of a communication apparatus in a second embodiment.

An exemplary operational process performed by the mobile phone 32 in the second embodiment will now described with reference to FIG. 7. FIG. 7 is a flowchart when the mobile phone 32 performs the wireless parameter automatic setting process with the AP 33 using the first method in the first setting mode. The operational process in the flowchart in FIG. 7 is started upon reception of the instruction to start the wireless parameter automatic setting process using the first method in the first setting mode from the user with the input unit 109. The operational process in the flowchart in FIG. 7 is performed by the control unit 102 that reads out the computer program stored in the storage unit 103 and executes the computer program that is read out. Part or all of the steps in the flowchart illustrated in FIG. 7 may be realized by hardware, such as ASICs.

Referring to FIG. 7, in Step S701, the mobile phone 32 captures an image of the QR code displayed by the AP 33 with the imaging unit 110 in response to an operation by the user with the input unit 109. The mobile phone 32 reads out decoded data about the QR code and determines whether the information necessary for setting the wireless parameters is included in the decoded data. When the information necessary for setting the wireless parameters is not included in the decoded data, the mobile phone 32 may perform the error termination or may capture an image of the QR code again.

When the information necessary for setting the wireless parameters is included in the QR code, in Step S702, the mobile phone 32 acquires the identification information about the AP 33 from the QR code. In Step S703, the mobile phone 32 transmits the search signal specifying the AP 33 identified by the identification information in the QR code with the wireless communication unit 104. Information about the first setting mode is included in the search signal as the additional information. The additional information is used to limit the search to the access point supporting the first setting mode or the access point identified by the identification information.

In Step S704, the mobile phone 32 waits for reception of the response signal from the AP 33. Upon reception of the response signal with the wireless communication unit 104, in Step S705, the mobile phone 32 confirms whether the identification information about the source of the response signal coincides with the identification information about the apparatus acquired from the QR code. If the mobile phone 32 confirms that the identification information about the source of the response signal does not coincide with the identification information about the apparatus acquired from the QR code (NO in Step S705), the process goes back to Step S704 to further wait for the response signal.

If the mobile phone 32 confirms that the identification information about the source of the response signal coincides with the identification information about the apparatus acquired from the QR code (YES in Step S705), in Step S706, the mobile phone 32 determines whether the wireless parameters set in the AP 33 have the initial values (factory default state) on the basis of the information included in the response signal. If the mobile phone 32 determines that the wireless parameters set in the AP 33 do not have the initial values (NO in Step S706), the operational process illustrated in FIG. 7 is terminated.

If the mobile phone 32 determines that the wireless parameters set in the AP 33 have the initial values (YES in Step S706), the mobile phone 32 selects the setting of the wireless parameters using the first method. The mobile phone 32 performs a process of establishing the encrypted wireless link with the AP 33 in order to securely set the wireless parameters using the first method. In Step S707, the mobile phone 32 transmits the wireless setting information request signal to request the wireless parameters to the AP 33 with the wireless communication unit 104 in order to acquire the wireless parameter having the initial values currently set in the AP 33. In Step S708, the mobile phone 32 determines whether the wireless setting information confirmation signal including the wireless parameters, which is the response signal to the request signal transmitted in Step S707, is received.

Upon reception of the wireless setting information confirmation signal including the wireless parameters, in Step S709, the mobile phone 32 establishes the wireless security connection with the AP 33 with the wireless communication unit 104 in accordance with the SSID, the encryption and authentication methods, and the key information included in the received wireless parameters.

In Step S710, the mobile phone 32 displays for the user in the display unit 105 a message indicating that the received wireless parameters have the initial values and update of the setting information is required. In Step S711, the mobile phone 32 generates the wireless parameters (the wireless parameter setting information) to be set in the communication partner apparatus in the same manner as in Step S508.

In Step S712, the mobile phone 32 transmits the wireless setting information request signal to request the wireless parameters to the AP 33. The wireless setting information request signal in Step S712 includes the wireless parameters generated in Step S711. The wireless parameters encrypted using a public key may be transmitted in Step S712. In Step S713, the mobile phone 32 determines whether the wireless setting information confirmation signal indicating that the wireless parameters are received, which is the response signal to the request signal transmitted in Step S712, is received. Upon reception of the wireless setting information confirmation signal, the operational process illustrated in FIG. 7 is terminated.

When the wireless network built by the AP 33 is changed to a wireless network using the wireless parameters that are newly set after the wireless setting information confirmation signal is received, the mobile phone 32 may perform the wireless security connection process with the AP 33 again.

As described above, since a warning is issued to the user and the wireless parameters are replaced with new wireless parameters when the wireless parameters set in the AP 33 have the initial values in the second embodiment, the security is improved.

Other Embodiments

The example is described in the above embodiments, in which the mobile phone 32 selects the first method or the second method to be performed on the basis of the information included in the response signal from the AP 33. However, the mobile phone 32 may select the first method or the second method in accordance with a user's operation. The mobile phone 32 may cause the user to set the first method or the second method before an image of the QR code is captured. The mobile phone 32 may present the identification information about the apparatus included in the QR code that is read out, when an image of the QR code is captured, to the user and may inquire the user of whether the first method or the second method is to be performed with the display unit 105. In this case, after the inquiry, the mobile phone 32 performs the first method or the second method in accordance with a selection by the user with the input unit 109.

The mobile phone 32 may select the first method or the second method in accordance with an operation mode selected by the user. For example, when a first mode to perform the first method is set in accordance with a user's operation with the input unit 109, the mobile phone 32 performs the image capturing with the imaging unit 110. Upon capturing of an image of the code information with the imaging unit 110 in the state in which the first mode is set by the user, the mobile phone 32 performs the processing of the first method on the basis of the content of the code information. When a second mode to perform the second method is set in accordance with a user's operation with the input unit 109, the mobile phone 32 performs the image capturing with the imaging unit 110. Upon capturing of an image of the code information with the imaging unit 110 in the state in which the second mode is set by the user, the mobile phone 32 performs the processing of the second method on the basis of the content of the code information.

When the response signal indicating that the wireless parameters have been set is received from the access point in a state in which the first method is selected by the user, the mobile phone 32 may display information indicating that the wireless parameters have been set in the display unit 105. In this case, the mobile phone 32 may perform the error termination or may cause the user to determine whether the processing of the first method is to be performed.

Similarly, when the response signal indicating that the wireless parameters have not been set or that the wireless parameters have the initial values is received in a state in which the second method is selected by the user, the mobile phone 32 may display information indicating that the wireless parameters have not been set or that the wireless parameters have the initial value in the display unit 105. In this case, the mobile phone 32 may perform the error termination or may cause the user to determine whether the processing of the second method is to be performed.

The mobile phone 32 may select the first method or the second method in accordance with the state of the mobile phone 32 when an image of the QR code is captured. For example, when the mobile phone 32 has already participated in the wireless network of the access point identified by the identification information included in the QR code when an image of the QR code is captured, the mobile phone 32 may not perform the second method but may perform the first method.

The mobile phone 32 may select the first method or the second method on the basis of the information included in the QR code. For example, when information indicating whether the wireless parameters have been set is included in the QR code, the mobile phone 32 may select the first method or the second method on the basis of this information. In this case, if the information indicating that the wireless parameters have been set is included in the QR code, the mobile phone 32 selects and performs the second method. If the information indicating that the wireless parameters have not been set is included in the QR code, the mobile phone 32 selects and performs the first method.

For example, when identification information indicating the setting mode is included in the QR code, the mobile phone 32 may select the first method or the second method on the basis of this information. In this case, if the identification information indicating the second method is included in the QR code, the mobile phone 32 selects and performs the second method. If the identification information indicating the first method is included in the QR code, the mobile phone 32 selects and performs the first method.

The operations in the first embodiment and the second embodiment may be appropriately combined with each other.

The configuration is described in the above embodiments, in which the information used to set the wireless parameters are exchanged between the apparatuses using an image of the QR code. However, instead of the capturing of an image of the QR code, wireless communication, such as NFC or Bluetooth (registered trademark), may be used. Alternatively, wireless communication, such as IEEE 802.11ad or TransferJet (registered trademark), may be used.

The QR code to be read out may not be only the QR coded displayed in the display unit in the above embodiments. For example, the QR code to be read out may be the QR code attached to the case of a communication device in the form of a seal or the like or the QR code attached to an instruction manual or a package, such as a cardboard, of a communication device at delivery. Instead of the QR code, the barcode or the two-dimensional code may be used. Instead of the machine-readable information, such as the QR code, information readable by the user may be used.

Although the case is described in the above embodiments, in which the communication between the apparatuses is performed through the wireless LAN communication conforming to the IEEE 802.11, the communication between the apparatuses is not limited to this. For example, the communication between the apparatuses may be performed with a wireless communication medium of, for example, wireless universal serial bus (USB), Multiband Orthogonal Frequency Division Multiplexing (OFDM) Alliance (MBOA), Bluetooth (registered trademark), Ultra Wide Band (UWB), ZigBee, or NFC. The UWB includes wireless USB, wireless 1394, WINET, and so on.

Although the case is described in the above embodiments, in which the access point of the wireless LAN provides the wireless parameters, the wireless parameters may not be provided by the access point of the wireless LAN. For example, a Group Owner of Wi-Fi Direct (registered trademark) may provide the wireless parameters.

The present invention may be realized by a process in which the programs realizing at least one function of the above embodiments are supplied to a system or an apparatus via a network or a storage medium and at least one processor in the computer in the system or the apparatus reads out the programs and executes the programs that are read out. The present invention may be realized by circuits (for example, ASICs) realizing at least one function of the above embodiments.

According to the present invention, it is possible to perform a process selected from multiple wireless parameter setting processes based on information that is necessary for setting wireless parameters and that is included in information resulting from analysis of an image that is captured.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-024502, filed Feb. 10, 2015, which is hereby incorporated by reference herein in its entirety.

The invention claimed is:

1. A communication apparatus comprising:
   one or more processors; and
   at least one memory storing executable instructions, which when executed by the one or more processors, cause the communication apparatus to:
      perform a first process of setting a wireless parameter for wireless communication in another communication apparatus by the communication apparatus based on first information that is necessary for setting the wireless parameter and that is acquired from an image that is captured;
      perform a second process of setting a wireless parameter for wireless communication, which is maintained by the another communication apparatus, in the communication apparatus based on the first information that is necessary for setting the wireless parameter; and
      select the first process or the second process to be performed based on second information acquired from an image that is captured.

2. The communication apparatus according to claim 1, wherein the executable instructions, when executed by the one or more processors, cause the communication apparatus to select the first process or the second process to be performed based on third information included in a signal received from an apparatus indicated by identification information acquired from the image that is captured.

3. The communication apparatus according to claim 1, wherein the executable instructions, when executed by the one or more processors, cause the communication apparatus to select the first process or the second process to be performed based on third information that indicates whether the wireless parameter has been set and that is included in a signal received from an apparatus indicated by identification information acquired from the image that is captured.

4. The communication apparatus according to claim 1, wherein the executable instructions, when executed by the one or more processors, cause the communication apparatus to select the first process when third information indicating that the wireless parameter has not been set is included in a signal received from an apparatus indicated by identification information acquired from the image that is captured and select the second process when third information indicating that the wireless parameter has been set is included in the signal received from the apparatus indicated by the identification information acquired from the image that is captured.

5. The communication apparatus according to claim 1, wherein the executable instructions, when executed by the one or more processors, cause the communication apparatus to select the first process or the second process to be performed based on third information that indicates whether the set wireless parameter has an initial value and that is included in a signal received from an apparatus indicated by identification information acquired from the image that is captured.

6. The communication apparatus according to claim 1, wherein the executable instructions, when executed by the one or more processors, cause the communication apparatus to select the first process when third information indicating that the set wireless parameter has an initial value is included in a signal received from an apparatus indicated by identification information acquired from the image that is captured and select the second process when third information indicating that the set wireless parameter does not have the initial value is included in the signal received from the apparatus indicated by the identification information acquired from the image that is captured.

7. The communication apparatus according to claim 1, wherein the executable instructions, when executed by the one or more processors, cause the communication apparatus to select the first process or the second process to be performed in accordance with a user's operation.

8. The communication apparatus according to claim 1, wherein the executable instructions, when executed by the one or more processors, further cause the communication apparatus to:
perform a third process of sharing a wireless parameter for wireless communication between the communication apparatus and the another communication apparatus through the wireless communication, image capturing being not performed in the third process; and
select any of the first process, the second process, and the third process to be performed.

9. The communication apparatus according claim 1, further comprising:
an imaging device that includes an image pickup device, the imaging device configured to photograph a barcode, a two-dimensional code, or a Quick Response (QR) code,
wherein the imaging device captures the image.

10. The communication apparatus according to claim 1, wherein the wireless parameter includes at least one of a Service Set Identifier (SSID), an encryption key, an encryption method, an authentication key, and an authentication method.

11. The communication apparatus according to claim 1, wherein the wireless parameter is information for communication conforming to an IEEE 802.11 standard.

12. A method of controlling a communication apparatus, the method comprising:
performing a first process of setting a wireless parameter for wireless communication in another communication apparatus by the communication apparatus based on first information that is necessary for setting the wireless parameter and that is acquired from an image that is captured;
performing a second process of setting a wireless parameter for wireless communication, which is maintained by the another communication apparatus, in the communication apparatus based on the first information that is necessary for setting the wireless parameter; and
selecting the first process or the second process to be performed based on second information acquired from an image that is captured.

13. A non-transitory storage medium storing a program causing a computer to perform:
performing a first process of setting a wireless parameter for wireless communication in another communication apparatus by the communication apparatus based on first information that is necessary for setting the wireless parameter and that is acquired from an image that is captured;
performing a second process of setting a wireless parameter for wireless communication, which is maintained by the another communication apparatus, in the communication apparatus based on the first information that is necessary for setting the wireless parameter; and
selecting the first process or the second process to be performed based on second information acquired from an image that is captured.

14. The communication apparatus according to claim 1, wherein
the first process is performed based on a public key that is acquired from an image that is captured, and
the second process is performed based on the public key.

* * * * *